United States Patent [19]

Hall

[11] 3,842,186

[45] Oct. 15, 1974

[54] STATIC PLATE FOR POWER TRANSFORMERS

[75] Inventor: Gary M. Hall, Farmland, Ind.

[73] Assignee: Westinghouse Electric Corporation, Pittsburgh, Pa.

[22] Filed: Oct. 23, 1973

[21] Appl. No.: 408,960

[52] U.S. Cl. ............................... 174/35 CE, 336/84

[51] Int. Cl. ............................................. H05k 9/00

[58] Field of Search ....... 336/84; 174/35 CE, 35 MS

[56] References Cited

UNITED STATES PATENTS

| | | | |
|---|---|---|---|
| 1,651,922 | 12/1927 | Hughes | 174/35 CE |
| 1,942,575 | 1/1934 | Shapiro | 174/35 CE |
| 2,858,451 | 10/1958 | Silversher | 174/35 MS |

*Primary Examiner*—Thomas J. Kozma
*Attorney, Agent, or Firm*—J. R. Hanway

[57] ABSTRACT

A static plate constructed for the enhancement of partial discharge characteristics by the elimination of foil to oil interfaces. The conducting foil of the static plate is positioned between two relatively flexible electrical insulating members and uniformly bonded thereto by a suitable adhesive. The relatively flexible insulating members are disposed between relatively rigid insulating members and bonded thereto by an adhesive which allows some relative movement between the rigid and flexible insulating members. Dimensional changes of the conducting foil and of the rigid insulating members produce irregularities in the surface of the conducting foil. Since the tightly bonded flexible insulating members conform to the shape of the conducting foil, a solid insulating material is always positioned between the conducting foil and the oil dielectric of the transformer. Thus, irregularities in the conducting foil of the static plate do not produce foil to oil interfaces which are conducive to partial discharge.

9 Claims, 7 Drawing Figures

STATIC PLATE FOR POWER TRANSFORMERS

BACKGROUND OF THE INVENTION

1. Field of the Invention

This invention relates, in general, to electrical inductive apparatus and, more specifically, to static plates for power transformers.

2. Description of the Prior Art

Static plates are used primarily in high voltage power transformers for the purpose of providing a satisfactory voltage distribution across the winding structures of the transformer upon the application of an impulse voltage through one or more of the external connections of the transformer. Generally, the static plate is located adjacent to the winding structure of the transformer which is susceptible to impulse voltages from the line to which the transformer is connected. Descriptions of static plates used in shell-form power transformers are contained in U.S. Pat. Nos. 3,376,531 and 3,643,196, both of which are assigned to the assignee of this invention.

The most common type of static plate which is being built and used presently consists of a metallic foil member which is electrically connected to a potential in the transformer winding, with the foil sandwiched or disposed between two electrical insulating members. The insulating members provide some of the necessary electrical insulation between the electrically conductive member of the static plate and other electrical members of the transformer, however, the insulating members also provide a supporting surface for the metallic member and facilitate construction of the static shield during transformer assembly. By using separate insulating members associated with the metallic foil, the static plate may be constructed separately from the windings of the transformer and positioned adjacent to the appropriate winding during the assembly of the transformer components.

Static plates are susceptible to extremely high voltages when an impulse voltage is applied across the terminals of the transformer. The high stress conditions developed thereby may produce partial discharges or corona adjacent to the metallic foil of the static plates unless proper insulating material is positioned with reference to the metallic foil. Since partial discharges are undesirable, both from the standpoint that they create objectionable radio interference and that they degrade the cooling dielectric and insulation structure of the transformer, it is highly desirable to reduce the amount of partial discharges in a transformer as much as practical. Therefore, it is desirable, and it is an object of this invention, to provide a static plate which has enhanced partial discharge characteristics as compared with static plates used in the prior art.

In the prior art methods of constructing static plates, the metallic foil is first bonded to an insulating structure, such as a sheet of pressboard, by a suitable adhesive. Although any wrinkles or irregularities in the foil may be smoothed out during the construction process, the later application of heat and oil to the assembled transformer structure causes the pressboard to shrink. Since the foil does not shrink at the same rate as the pressboard, some failure of the bond between the foil and the pressboard occurs. Thus, a void exists between portions of the metallic plate and the pressboard insulating member to which it was originally bonded. Although these voids are generally filled with transformer oil upon impregnation of the insulation structure with such a cooling dielectric, the susceptibility of the static plate to partial discharges is higher under such conditions than when the foil is directly adjacent to the pressboard which has better insulating properties than the coolant dielectric. Thus, it is desirable, and it is another object of this invention, to provide a static plate which is constructed in such a manner that, upon heating and cooling of the winding structure, the metallic element of the static plate does not acquire an interface directly with the transformer oil, therefore improving the corona characteristics of the static plate.

SUMMARY OF THE INVENTION

There is disclosed herein a new and useful static plate constructed in such a manner that wrinkles or irregularities in the metallic foil of the static plate do not produce direct foil to oil interfaces which are susceptible to partial discharges. The metallic foil is disposed between and bonded to two relatively flexible insulating members constructed of a suitable material such as kraft paper. This structure is disposed between two relatively rigid insulating members, such as pressboard, and suitably bonded thereto. The bond between the foil and the flexible insulating members is provided by a suitable adhesive which tightly and uniformly attaches the foil to the flexible insulating members at all positions. The bond between the flexible and the rigid insulating members is provided by an adhesive which is disposed suitably to provide a bond which will allow some relative movement of the metallic foil with respect to the rigid insulating members wihtout breaking the bond between the metallic member and the flexible insulating members. When wrinkles or irregularities occur during the drying and oil impregnating processes, the flexible insulating material conforms to the shape of the foil and constantly provides a solid insulating material between the foil and the oil dielectric of the transformer. Thus, direct foil to oil interfaces between the conducting foil of the static plate and the oil dielectric of the transformer are eliminated. Therefore, the partial discharge characteristics of the corona shield are improved over the shields used in the prior art.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
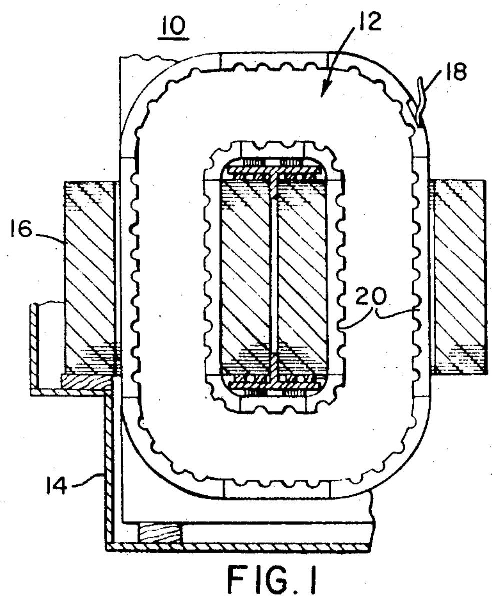
FIG. 1 is a partial elevational view of a shell form power transformer having a static plate disposed in the winding structure of the transformer.

Throughout the following description, similar reference characters refer to similar elements or members in all the figures of the drawing.

Referring to the drawing, and to FIG. 1 in particular, there is shown a shell-form power transformer 10 constructed with a static plate 12 disposed adjacent to the winding structure of the transformer. The transformer tank 14 supports the magnetic core 16 and the winding structure disposed therearound. Lead 18 extends from the static plate 12 to provide means for connecting the electrically conductive member of the static plate 12 to the appropriate potential in the transformer 10. Insulating channel members 20 are disposed around the edges of the static plate 12 to provide sufficient electrical insulation and mechanical integrity of the static plate.

Figure 2:
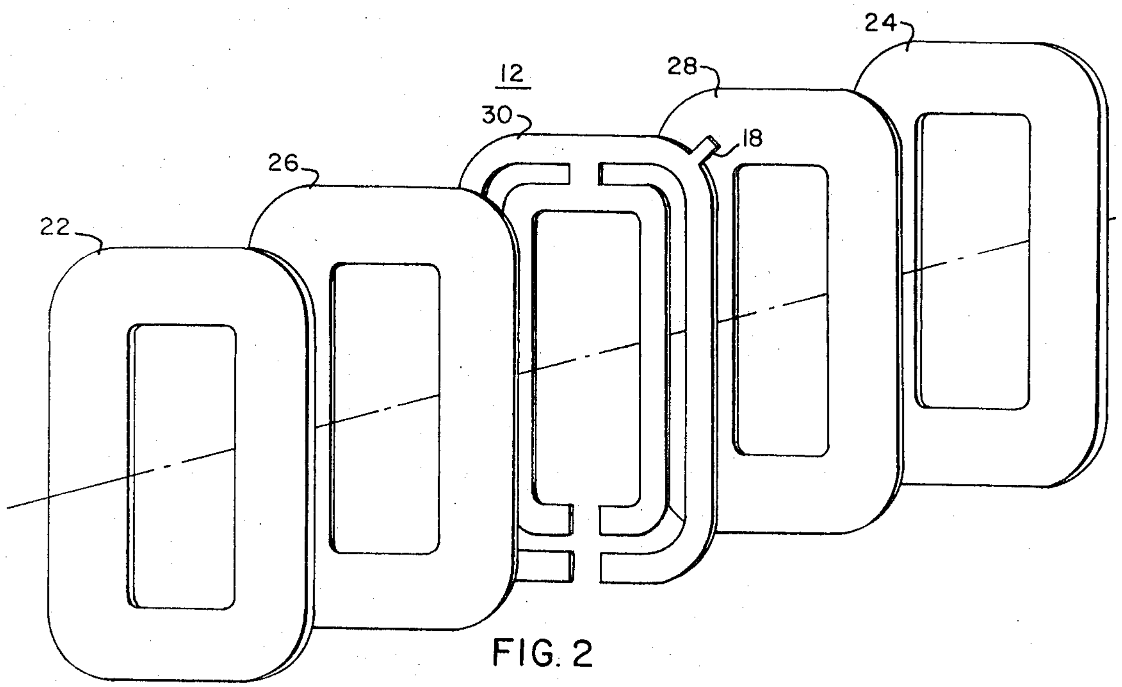
FIG. 2 is an exploded view of the major components of the static plate shown in FIG. 1.

FIG. 2 illustrates an exploded view of the major components of the static plate 12. A first relatively rigid insulating member 22 and a second relatively rigid insulating member 24 are positioned to form the outer surfaces of the static plate 12. Contained between the members 22 and 24 is a first relatively flexible insulating member 26 and a second relatively flexible insulating member 28. An electrically conductive metallic foil member 30 is positioned between the insulating members 26 and 28. The members 22, 26, 30, 28 and 24 are appropriately bonded together to provide the electrical and mechanical characteristics desired for the static plate 12.

The insulating members 22 and 24 may be constructed of pressboard or any other suitable insulating material which provides sufficient electrical insulation and sufficient mechanical strength to facilitate assembly of the static plate 12 and protection of the members thereof during the assembly of the transformer. Compared to the insulating members 26 and 28, and to the metallic foil 30, the insulating members 22 and 24 are relatively rigid, that is, are not generally susceptible to wrinkling or deformations during the oil impregnating process. In addition, members 22 and 24 may be subjected to greater mechanical stresses without permanent dimensional changes than the insulating members 26 and 28 and the conducting member 30. That is, the insulating members 26 and 28 and the conducting member without substantial deformation of the insulating members 22 and 24.

The insulating member 26 and 28 are relatively flexible compared to the insulating members 22 and 24. A suitable material consists of three-mil kraft paper, alalthough thin pressboard, crepe paper, and other suitable materials could also be used. The conductive member 30 includes an arrangement of metallic foil, such as nickel-silver foil, which is arranged to provide the capacitive feature of the static plate without significant current producing configurations. As can be seen from FIG. 2, the assembled static plate 12 provides a relatively flexible insulating member between each side of the conductive member 30 and the rigid insulating members 22 and 24.

Figure 3:
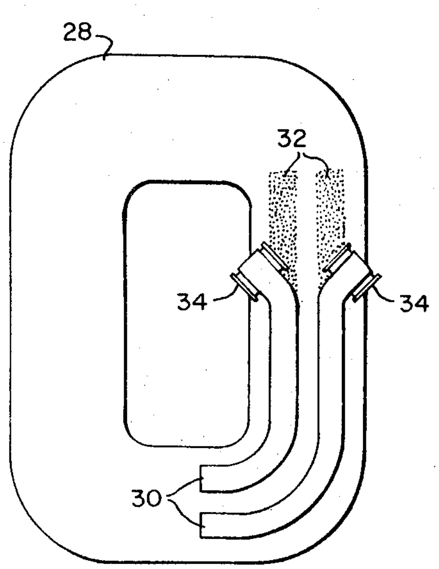
FIG. 3 illustrates a step in the construction of the static plate shown in FIG. 1.

FIG. 3 illustrates a step in the construction of the static plate 12. The conductive member 30 is formed on the flexible insulating member 28 by suitably positioning strips of metallic foil onto the insulating member 28 and bonding the joining surfaces by an adhesive 32. FIG. 3 illustrates the metallic strips being obtained from the spools 34, however, other arrangements may be used, such as cutting suitably sized strips from a sheet of metallic foil. Preferably, the adhesive 32 is compatible with the cooling dielectric and does not contain corona producing voids. The adhesive 32 is placed between the foil 30 and the insulating member 28 substantially uniformly so that the entire surface of the foil is bonded tightly to the insulating member 28. A subsequent step in the construction of the static plate 12 would include similarly applying an adhesive between the foil 30 and the flexible insulating member 26 which would be placed over the members shown in FIG. 3. Thus, the metallic foil 30 has a relatively flexible insulating member tightly and uniformly bonded to each side thereof.

Figure 4:
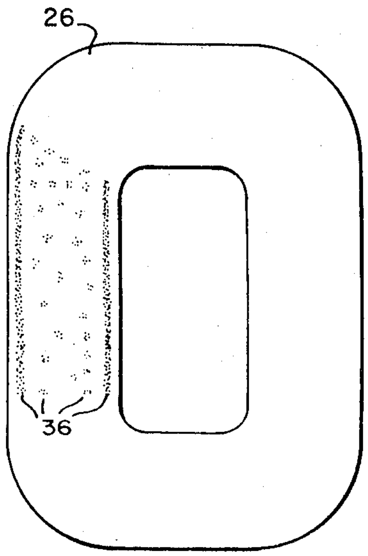
FIG. 4 illustrates another step in the construction of the static plate shown in FIG. 1.

FIG. 4 illustrates another step in the construction of the static plate 12. This step occurs after the insulating members 26 and 28 and the conductive member 30 are properly bonded together. An adhesive material 36 is placed upon the insulating member 26 as shown in FIG. 4. Although other arrangements may be used, the arrangement shown in FIG. 4 provides the type of bond which is necessary for the proper operation of the invention. As partially shown in FIG. 4, a bead of adhesive is disposed around the outside edge of the insulating member 26 and also around the inside edge of the insulating member 26. In addition to the beads of adhesive, spots of adhesive are located at intermittent spaces across the surface of the insulating member 26. After the adhesive has been applied around the entire surface of the insulating member 26, the rigid insulating member 22 would be placed upon the insulating member 26 and properly pressed together until the adhesive has cured. A similar adhesive application technique would be used between the insulating members 28 and 24 which are located on the other side of the conductive member 30.

Other arrangements for deposition of the adhesive 36 may be used. Instead of applying the adhesive 36 to the iinsulating member 26, the adhesive may be applied to the rigid insulating member 22, or to both the insulating members 22 and 26. The arrangement of the adhesive 36 may also be different if a different type of adhesive is used. For instance, if an adhesive which does not tightly bond the insulating members to each other is used, a larger surface area of the insulating member may be covered with the adhesive.

It is conceivable that, with a suitable adhesive, the entire surface of the insulating members may be covered with adhesive and still provide the bonding characteristics necessary for the proper operation of the invention. For proper operation of the invention, the bond between the relatively rigid insulating members and the relatively flexible insulating members must be relatively loose, that is, must not be as strong as the tight bond between the relatively flexible insulating members and the electrically conductive member of the static plate 12. Any arrangement of the adhesive application pattern, or any combination of the adhesive materials used which provide the desired bonds are within the contemplation of this invention.

Figure 5:
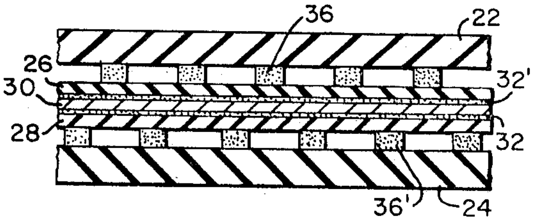
FIG. 5 is a partial sectional view of a static plate constructed according to this invention illustrating the relationship between the various insulating, conducting, and bonding layers of the static plate.

FIG. 5 is a partial cross-section of a static plate constructed according to the specific procedure discussed in connection with FIGS. 2, 3 and 4. The conductive member 30 is uniformly bonded to the flexible insulating members 26 and 28 by the adhesive 32' and 32, respectively. Similarly, the rigid insulating members 22 and 24 are nonuniformly bonded to the insulating members 26 and 28 by the adhesive 36 and 36', respectively. Assuming the same type of material is used for the adhesives 32, 32', 36 and 36', the bond between the conductive member 30 and the relatively flexible insulating members 26 and 28 is substantially stronger than the bond between the relatively rigid insulating members 22 and 24 and the relatively flexible insulating members 26 and 28, respectively. Thus, differential rates of expansion of the rigid insulating members 22 and 24 and the conductive member 32 will cause failure of the bond provided by the adhesives 36 and 36' before that of the bonds provided by the adhesives 32 and 32'.

Figure 6:
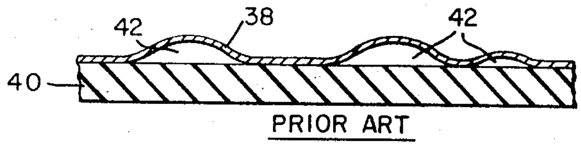
PRIOR ART FIG. 6
FIG. 6 generally illustrates the wrinkling characteristics of static plates constructed according to the prior art.

The significance of the difference between the strength of the bonds between the various insulating and conductive members is explained in connection with FIGS. 6 and 7. FIG. 6 is a partial sectional view showing generally the relationship between the conductive member and the rigid insulating member of a static plate constructed according to the prior art. During processing of the transformer components, irregularities or wrinkles in the conductive member 38 provide voids 42 between the conductive member 38 and the insulating member 40. Since the pressboard 40 decreases in dimension as compared to the foil of the conductive member 38, the adhesive bond, which is not illustrated, between the members 38 and 40 must partially fail as a result of excessive forces produced by the different expansion characteristics. Since the insulating member 40 is too rigid to conform to the irregularities in the conductive member 38, the voids 42 provide regions where oil dielectric may penetrate the pressboard and occupy the area adjacent to the conductive member 38. Thus, the voltage at which partial discharges, or corona, will occur are reduced since the dielectric strength of the insulating oil is less than that of the solid insulating member 40.

Figure 7:
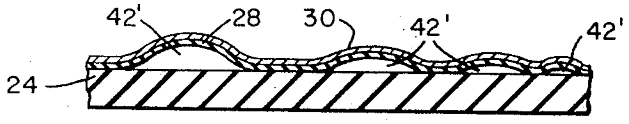
FIG. 7 generally illustrates the wrinkling characteristics of a static plate constructed according to this invention.

FIG. 7 generally illustrates the position of the conductive member 30 relative to the rigid insulating member 24 when constructed according to this invention. As in FIG. 6, the adhesive providing the bonds between the various members are not illustrated. Due to the tight and uniform bonding of the conductive member 30 to the relatively flexible insulating member 28, irregularities produced in the conductive member 30 during processing of the transformer produce similar irregularities in the shape of the flexible insulating member 28. Since the bond between the insulating members 28 and 24 is not as strong as the bond between the insulating member 28 and the conductive member 30, the insulating member 28 always conforms to the shape of the conductive member 30. Thus, oil forming in the void spaces 42' does not come directly into contact with the conductive member 30. Therefore, the conductive member 30 is always adjacent to a solid insulating material which has a higher dielectric strength than transformer oil and the corona characteristics of the static plate are substantially enhanced. Although FIG. 7 shows the conformity of the flexible insulating member 28 to the conductive member 30, the static plate 12 as constructed herein would also include the flexible insulating member 26 which conforms to the other surface of the conductive member 30, thereby providing solid insulating material adjacent to both sides of the conductive member 30, regardless of the amount of wrinkling or irregularities formed in the conductive member 30 during the construction and processing of the transformer components.

By using the components described herein, and by providing suitable bonds between the various components, either by the different arrangements of applying the same type of adhesive, or by using different adhesives, a static plate may be constructed which exhibits substantially better corona characteristics than static plates contructed according to the prior art. Since nummerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A static plate for electrical inductive apparatus, comprising:

first and second relatively rigid insulating members;

first and second relatively flexible insulating members each having first and second sides;

an electrically couductive member having first and second sides;

the first side of said conductive member being tightly bonded to the first side of said first flexible insulating member by an adhesive;

the second side of said conductive member being tightly bonded to the first side of said second flexible insulating member by an adhesive;

the second side of said first flexible insulating member being relatively loosely bonded to the first rigid insulating member; and the second side of said second flexible insulating member being relatively loosely bonded to the second rigid insulating member.

2. The static plate of claim 1 wherein the first and second relatively rigid insulating members are constructed of pressboard.

3. The static plate of claim 1 wherein the first and second relatively flexible insulating members are constructed of kraft paper.

4. The static plate of claim 1 wherein the electrically conductive member comprises a sheet of nickel silver foil.

5. The static plate of claim 1 wherein the adhesive between the electrically conductive member and the flexible insulating members is uniformly disposed to contact substantially all of the adjacent surfaces of the conductive member and the insulating members.

6. The static plate of claim 1 wherein the adhesive vetween the respective rigid and flexible insulating member is disposed to contact the adjacent surfaces only at spaced positions.

7. The static plate of claim 1 wherein the adhesive located between the flexible insulating members and the conductive member provides a stronger bond than the adhesive located between the rigid and flexible insulating members.

8. The static plate of claim 7 wherein the stronger bond is achieved by applying the adhesive between the flexible insulating members and the conductive member over a larger surface area than the adhesive between the rigid and flexible insulating members.

9. The static plate of claim 7 wherein the stronger bond is achieved by using different adhesives between the flexible insulating members and the conductive member and between the rigid and flexible insulating members.

* * * * *